(12) United States Patent
Benjamignan et al.

(10) Patent No.: US 12,478,095 B2
(45) Date of Patent: *Nov. 25, 2025

(54) ELECTRICALLY-POWERED HOOKAH APPARATUS, CAPSULE OF COMBUSTIBLE MATERIAL FOR USE THEREWITH AND METHOD FOR CONTROL THEREOF

(71) Applicant: AIR IP HOLDINGS LIMITED, Dubai (AE)

(72) Inventors: Alexandre Benjamignan, Roxboro (CA); Elie Kanawati, Pierrefonds (CA)

(73) Assignee: AIR IP HOLDINGS LIMITED, Dubai (AE)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,734

(22) Filed: Mar. 19, 2024

(65) Prior Publication Data

US 2024/0215638 A1    Jul. 4, 2024

Related U.S. Application Data

(63) Continuation of application No. 16/906,599, filed on Jun. 19, 2020, now Pat. No. 11,930,841, which is a
(Continued)

(51) Int. Cl.
*A24F 1/30* (2006.01)
*H01M 10/42* (2006.01)
(Continued)

(52) U.S. Cl.
CPC ............. *A24F 1/30* (2013.01); *H01M 10/425* (2013.01); *H01M 10/486* (2013.01);
(Continued)

(58) Field of Classification Search
CPC ........ A24F 1/30; A24F 40/40; H01M 10/425; H01M 10/486; H01M 2220/30; H05B 1/0244; H05B 2203/021
See application file for complete search history.

(56) References Cited

U.S. PATENT DOCUMENTS

| | | |
|---|---|---|
| 3,402,723 A | 9/1968 | Hu |
| 3,918,464 A | 11/1975 | Kolodziej |

(Continued)

FOREIGN PATENT DOCUMENTS

| | | |
|---|---|---|
| CA | 2599199 A1 | 2/2009 |
| CN | 201336930 Y | 11/2009 |

(Continued)

*Primary Examiner* — Galen H Hauth
*Assistant Examiner* — Baileigh Kate Darnell
(74) *Attorney, Agent, or Firm* — Hayes Soloway P.C.

(57) ABSTRACT

The invention allows for the simplified operation and maintenance of a hookah apparatus. In a first aspect of the present invention, an electrically-powered hookah apparatus is provided. The hookah apparatus comprises a vessel and a housing. The housing comprises a first section and a second section. The first section is removably fitted over the vessel, and the second section comprises a combustion unit including an electronics unit. The combustion unit comprises a capsule holder configured to hold capsules of combustible material and a heating unit configured to heat the capsules. The electronics unit comprises a power unit and a programmable controller connected thereto, the controller configured to controllably power the heating unit. In a second aspect of the present invention, a capsule of combustible material is provided. In a third aspect of the present invention, a method of operating an electrically-powered hookah apparatus is provided.

27 Claims, 9 Drawing Sheets

Related U.S. Application Data continuation of application No. 15/310,638, filed as application No. PCT/CA2014/051198 on Dec. 11, 2014, now Pat. No. 10,820,626.

(60) Provisional application No. 61/991,728, filed on May 12, 2014.

(51) Int. Cl.
*H01M 10/48* (2006.01)
*H05B 1/02* (2006.01)
*A24F 40/40* (2020.01)

(52) U.S. Cl.
CPC ............ *H05B 1/0244* (2013.01); *A24F 40/40* (2020.01); *H01M 2220/30* (2013.01); *H05B 2203/021* (2013.01)

(56) References Cited

U.S. PATENT DOCUMENTS

| | | | |
|---|---|---|---|
| 4,031,906 A | 6/1977 | Knapp | |
| 4,133,318 A | 1/1979 | Gross | |
| 4,788,988 A | 12/1988 | Titus | |
| 7,287,530 B1 | 10/2007 | Stuart | |
| 7,565,908 B2 | 7/2009 | Liu | |
| 7,690,076 B2 | 4/2010 | Tannous | |
| 7,775,218 B2 | 8/2010 | Shraiber | |
| 8,347,892 B2 | 1/2013 | Mehio | |
| 8,464,725 B2 | 6/2013 | Badawi | |
| 8,550,091 B2 | 10/2013 | Yomtov | |
| 9,387,173 B2 | 7/2016 | Wright et al. | |
| 2004/0124988 A1 | 7/2004 | Leonard et al. | |
| 2005/0279371 A1 | 12/2005 | Billard et al. | |
| 2006/0086364 A1 | 4/2006 | Liu | |
| 2006/0086365 A1 | 4/2006 | Liu | |
| 2007/0056599 A1 | 3/2007 | Zoumut et al. | |
| 2007/0215164 A1 | 9/2007 | Mehio | |
| 2007/0235440 A1* | 10/2007 | Gu ....................... H05B 1/0244 219/482 |
| 2008/0060663 A1 | 3/2008 | Hamade et al. | |
| 2009/0084391 A1 | 4/2009 | Krupp et al. | |
| 2009/0151717 A1 | 6/2009 | Bowen et al. | |
| 2010/0083973 A1 | 4/2010 | Zoumut | |
| 2010/0126516 A1 | 5/2010 | Yomtov et al. | |
| 2010/0126518 A1 | 5/2010 | Saleh | |
| 2010/0186091 A1 | 7/2010 | Turner et al. | |
| 2010/0212679 A1 | 8/2010 | Bishara et al. | |
| 2010/0252057 A1 | 10/2010 | Saleh et al. | |
| 2010/0263681 A1 | 10/2010 | Zhao et al. | |
| 2011/0180080 A1 | 7/2011 | Fares et al. | |
| 2011/0186059 A1 | 8/2011 | Mouhanna et al. | |
| 2011/0186060 A1 | 8/2011 | Saleh et al. | |
| 2012/0042884 A1 | 2/2012 | Mukaddam et al. | |
| 2012/0067357 A1 | 3/2012 | Boutros et al. | |
| 2012/0199572 A1 | 8/2012 | Shen et al. | |
| 2013/0199547 A1 | 8/2013 | Popmarkov et al. | |
| 2014/0060554 A1 | 3/2014 | Collett et al. | |
| 2014/0069446 A1 | 3/2014 | Haddad et al. | |
| 2014/0230832 A1 | 8/2014 | Saliman et al. | |
| 2014/0366898 A1* | 12/2014 | Monsees ................. A24F 40/30 131/329 |
| 2015/0053221 A1 | 2/2015 | Asghar-Sheikh et al. | |
| 2015/0136158 A1 | 5/2015 | Stevens et al. | |
| 2015/0230521 A1* | 8/2015 | Talon ...................... A24F 40/50 131/328 |
| 2015/0313284 A1* | 11/2015 | Liu ....................... H05B 1/0244 219/490 |
| 2016/0157668 A1 | 6/2016 | Bugnano et al. | |
| 2016/0206001 A1 | 7/2016 | Eng et al. | |
| 2016/0235122 A1 | 8/2016 | Krietzman et al. | |
| 2016/0331913 A1 | 11/2016 | Bourque | |
| 2017/0099873 A1 | 4/2017 | Benjamignan et al. | |
| 2017/0172203 A1 | 6/2017 | Gebara et al. | |
| 2017/0251718 A1 | 9/2017 | Armoush et al. | |
| 2018/0192694 A1 | 7/2018 | Butler | |
| 2018/0271150 A1 | 9/2018 | Sparklin et al. | |
| 2021/0186090 A1 | 6/2021 | Hagen et al. | |
| 2021/0186091 A1 | 6/2021 | Hagen et al. | |
| 2021/0267272 A1 | 9/2021 | Hagen et al. | |

FOREIGN PATENT DOCUMENTS

| | | |
|---|---|---|
| CN | 202276825 U | 6/2012 |
| CN | 103653244 A | 3/2014 |
| CN | 104055225 A | 9/2014 |
| CN | 104522890 B | 4/2015 |
| CN | 112930122 A | 6/2021 |
| CN | 112930123 A | 6/2021 |
| DE | 498312 C | 5/1930 |
| DE | 202005015795 U1 | 1/2006 |
| DE | 202008010123 U1 | 4/2009 |
| DE | 102014005884 A1 | 10/2015 |
| DE | 102015121435 B4 | 5/2017 |
| EP | 2179967 B1 | 8/2010 |
| EP | 2292108 A1 | 3/2011 |
| EP | 2422633 A1 | 2/2012 |
| FR | 3019989 A1 | 10/2013 |
| GB | 2553773 A | 10/2016 |
| WO | 2013001272 A1 | 1/2013 |
| WO | 2013057185 A1 | 4/2013 |
| WO | 2014012216 A1 | 1/2014 |
| WO | 2015172224 A1 | 11/2015 |
| WO | 2017080545 A1 | 5/2017 |

* cited by examiner

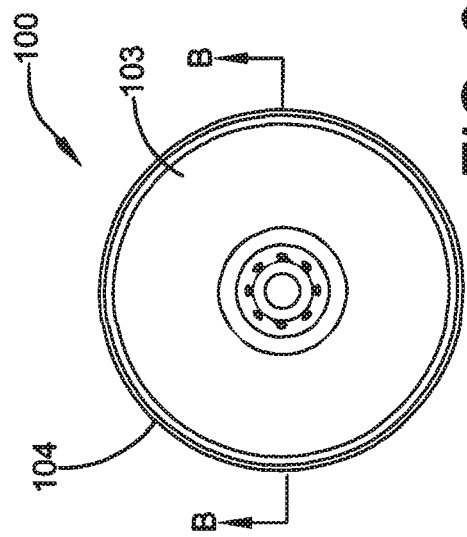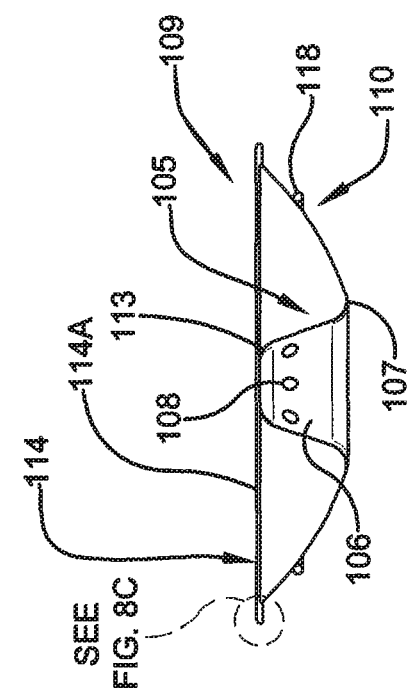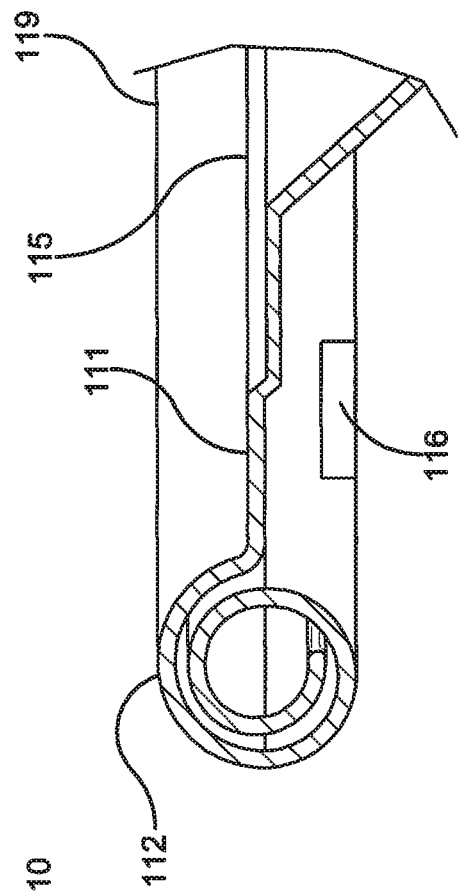

ELECTRICALLY-POWERED HOOKAH APPARATUS, CAPSULE OF COMBUSTIBLE MATERIAL FOR USE THEREWITH AND METHOD FOR CONTROL THEREOF

CROSS-REFERENCE TO RELATED APPLICATIONS AND PRIORITY

This application is a Continuation application of U.S. patent application Ser. No. 16/906,599 filed on Jun. 19, 2020 (issued as U.S. Pat. No. 11,930,841 on Mar. 19, 2024), which is a Continuation of U.S. patent application Ser. No. 15/310,638, filed on Nov. 11, 2016 (issued as U.S. Pat. No. 10,820,626), which claims priority to PCT Patent Application No. PCT/CA2014/051198 filed Dec. 11, 2014, which claims priority from U.S. Provisional Application No. 61/991,728 filed May 12, 2014. Each of these patent applications are herein incorporated by reference in their entirety.

FIELD OF THE INVENTION

The present disclosure relates to the field of water-pipes. More particularly, it relates to electrically operated hookah devices.

BACKGROUND

Hookahs, also known as narghile, argileh, shisha, hubble-bubble, and goza, are popular apparatuses for water-pipe smoking. Conventional hookahs use charcoal to ignite combustible material and produce smoke. The combustible material is placed in a bowl, covered with perforated aluminum and a charcoal brick is ignited and placed thereon. Inhaling through a hose draws air into the bowl, heating the combustible material and generating smoke. The smoke is drawn by a pipe into water before eventually exiting through the hose.

Traditional hookahs suffer from several issues. For example, preparing, operating and maintaining a hookah can be tedious tasks. Many different tools are required, including scrubs, prongs, brushes etc. The process of preparing a hookah for smoking is time consuming, messy and requires a certain level of skill. In order to prepare a hookah for smoking, one must handle loose tobacco or other combustible material, place it into the bowl and cover it in a proper fashion so that it can generate smoke optimally. Operating a hookah is similarly complicated. One must maneuver or replace the coals in order to heat the combustible material at an optimal temperature, and in order to ensure that all of the combustible material is eventually consumed. Finally, maintaining the hookah is an equally daunting task. Cleaning the bowl requires the removal of consumed combustible material and juices produced therefrom. It may also require the complex disassembly and manual cleaning or replacement of several components.

There are also several health and safety concerns associated with traditional hookahs. For example, the use of charcoal produces toxic chemicals, such as carbon monoxide or metals, which are eventually inhaled by the user. Additionally, the coals can get dangerously hot during operation. There is little protection to stop an imprudent user from touching the coals and getting burned. Furthermore, traditional hookahs are prone to tipping, and the coals are not fixed to the bowl. There is a potential risk of coals falling on an area around the hookah, causing damage or bodily harm.

Known to the applicant are U.S. Pat. No. 8,550,091 (YOMTOV et al.) and US Patent Application Nos. 2006/0086365 (LIU) and 2010/0212679 (BISHARA). LIU, YOMTOV and BISHARA each disclose means to adapt hookahs with electrical heating components in lieu of coals. Disadvantageously, these electrical heating components are not power efficient. Additionally, they do not disclose improvements to simplify the preparation of the hookah for smoking. Furthermore, they disclose the use of external electrical components and wiring, potentially making the hookah less stable and more difficult to transport and to operate.

Also known to the applicant is International Patent Application No. WO 2013/001272 (JALLOUL et al.). JALLOUL discloses a prepackaged smokable material capsule. Disadvantageously, the capsule disclosed in JALLOUL is designed for use with traditional hookah apparatuses and is not adapted for use with an electrically-heated hookah. Furthermore, the capsule requires the use of a specialized retaining apparatus around a traditional hookah bowl in order to function properly.

In light of the foregoing, there is a need for an improved electrically-powered hookah apparatus and method for operation thereof which overcomes at least some of the issues in the prior art. There is also a need for an improved capsule adapted for use with an electrically-powered hookah.

SUMMARY

According to an aspect of the present invention, an electrically-powered hookah apparatus is provided. The apparatus includes a vessel for containing liquid and provided with an aperture. The apparatus also includes a housing which has a first section and a second section, and a conduit. The first section is removably fitted over the aperture of the vessel and forms a smoking chamber together with the vessel. The smoking chamber is provided with a smoke outlet which is connectable to a hose pipe. The second section includes a combustion unit and an electronics unit. The combustion unit includes a capsule holder configured to hold capsules of combustible material and a heating unit configured to heat the capsules and generate smoke from the combustible material. The electronics unit includes an electric power unit and a programmable controller connected to the power unit and configured to controllably power the heating unit. Finally, the conduit forms part of a smoke path from the combustion unit to the smoke outlet. The conduit has a first extremity and a second extremity. The first extremity extends in the combustion unit, and the second extremity extends in the vessel. The second extremity is sized and configured to be immersed in liquid during operation of the apparatus.

According to another aspect of the present invention, a method for controlling an electrically-powered hookah apparatus is provided. The method first includes the step of providing an electrically-powered hookah such as the one described above. Next, the method includes the step of heating the capsules by providing power from the electric power unit to the heating unit. Finally, the method includes the step of using the programmable controller to control the temperature of the heating unit.

According to yet another aspect of the present invention, a capsule of combustible material is provided. The capsule includes a capsule body having a top surface and a bottom surface, the top surface being concave and delimited at its outer edge by a rim. The top surface of the capsule includes a protrusion, which has a protrusion peak below a plane defined by the rim. A plurality of holes is provided in sidewalls of the protrusion, the holes piercing the top and bottom surfaces of the capsule body. Finally, the capsule includes combustible material which is supported by the top surface.

BRIEF DESCRIPTION OF THE DRAWINGS

FIG. 8A is a top view of the capsule of FIG. 7.

FIG. 8B is a cross section view of the capsule of FIG. 8A, taken along line B-B.

FIG. 8C is a detail view of FIG. 8B at location 8C.

DETAILED DESCRIPTION OF THE DRAWINGS

In the following description, the same numerical references refer to similar elements. Certain elements may not be identified in some figures if they are more clearly identified in other figures. The embodiments described in the present description are preferred embodiments only; they are given solely for exemplification purposes.

In addition, it will be appreciated that positional descriptions such as "top", "bottom", "side", "lower", "upper", and the like should, unless otherwise indicated, be taken in the context of the figures and should not be considered as limiting or as implying a required orientation during use.

i. Overview

Figure 1:
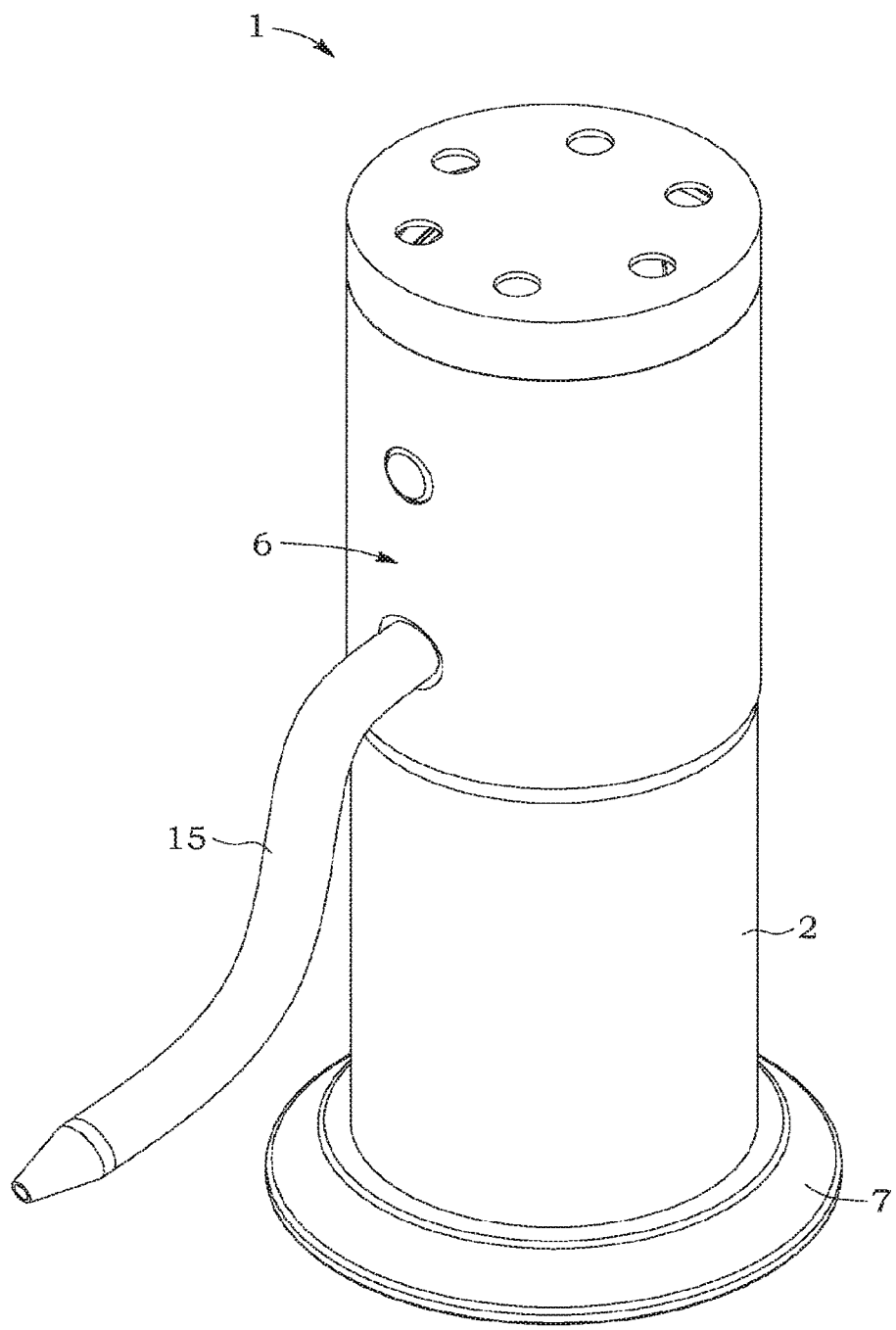
FIG. 1 is a perspective view of a hookah apparatus, according to an Embodiment.
Figures 2, 2A:
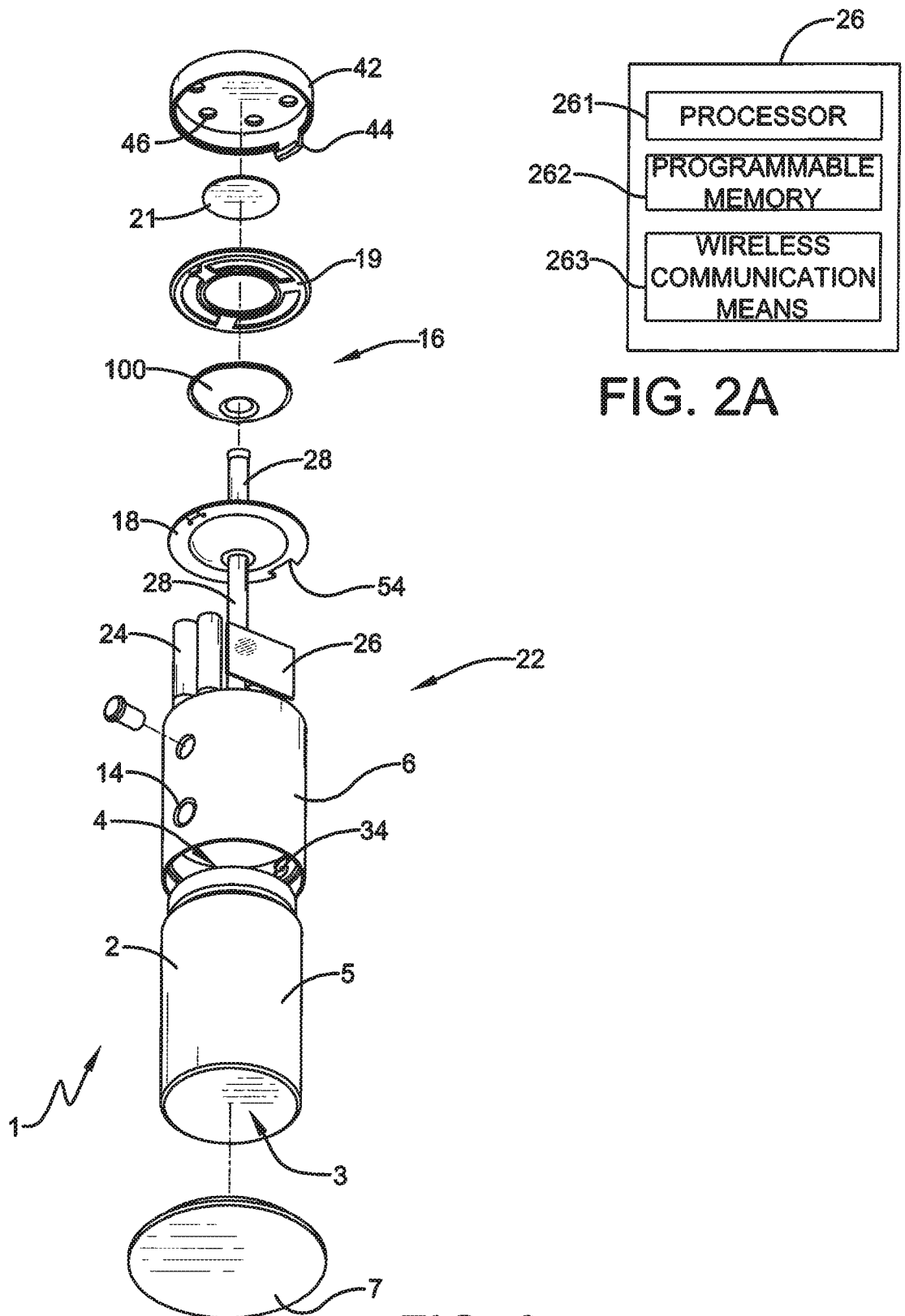
FIG. 2 is an exploded perspective view of the hookah apparatus of FIG. 1.
FIG. 2A is a schematic diagram of a programmable controller in the hookah apparatus of FIG. 1, according to an embodiment.
Figure 3:
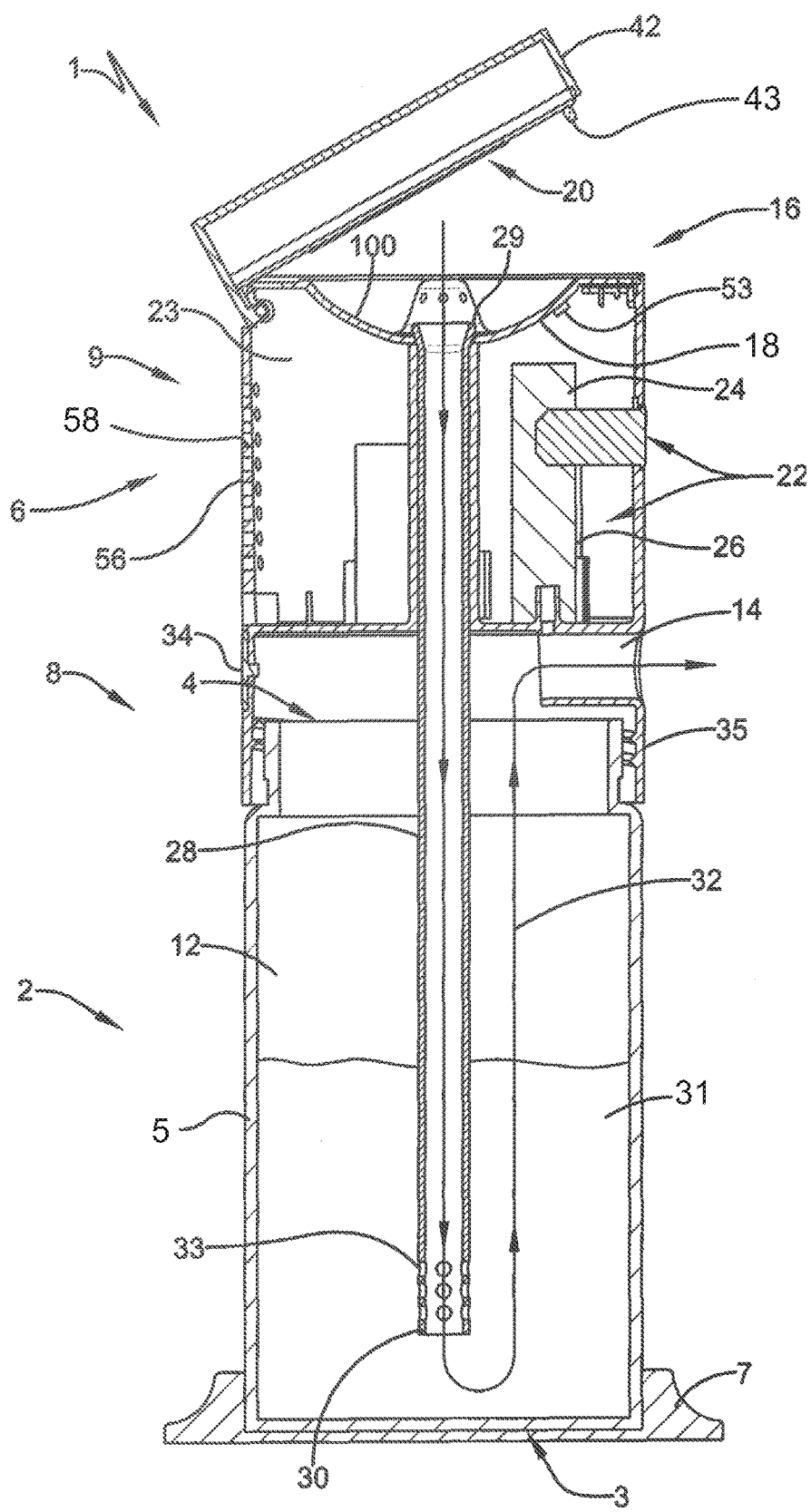
FIG. 3 is a side cross section view of a housing in the hookah apparatus of FIG. 1, according to a possible embodiment.

With reference to FIGS. 1, 2 and 3, an electrically-powered hookah apparatus 1 is provided according to a possible embodiment. The hookah 1 comprises mainly of a housing 6 fitted over a vessel 2, with a conduit 28 extending therebetween.

The vessel 2 is a container configured to hold a liquid 31. The vessel can be made of any liquid-impermeable material, such as plastic or glass for example. The vessel 2 is provided with a sidewall 5 extending between a base 3 and an aperture 4. In the illustrated embodiment, the vessel 2 is substantially cylindrical, but other configurations are also possible. The base 3 allows the vessel to rest stably. In the present embodiment, the base 3 is a flat surface, but other configurations are also possible. For example, the base 3 could comprise legs, or could be sized and shaped to fit inside a standard automobile cup holder. In the present embodiment, the base 3 is provided with a stand 7. The stand 7 can be made of silicone or rubber, for example, and helps prevent lateral movement of the hookah 1 while also increasing its stability. In some embodiments, the base 3 could be provided with an adaptor to fit inside a standard automobile cup holder, or the like. The aperture 4 is an opening allowing liquid 31 to be poured into the vessel 2, and is sized and shaped for the housing 6 to fit thereon. In the present embodiment, the vessel 2 is fitted to the housing 6 via a threaded connection 35. Preferably, the connection between the vessel 2 and housing 6 is airtight, for example with the use a gasket fitted on the jar which. Of course, other types of connections are also possible, such as a snap-on connection, magnetic connection, or press-fit connection, which may also provide an airtight seal.

The housing 6 comprises a first section 8 and a second section 9. The first section 8 is fitted over the aperture 4 of the vessel 2 and forms, together with the vessel 2, a smoking chamber 12. The smoking chamber 12 is an isolated space where smoke can accumulate while being inhaled by a user. The smoking chamber 12 is provided with a smoke outlet 14 which allows smoke to exit the smoking chamber. The smoke outlet 14 may be connectable to a hose 15, preferably with an airtight connection, for example via a seal fixed to and end of the hose 15. In operation, a user inhales through the hose 15, drawing smoke into the smoking chamber 12 and eventually out through the smoke outlet 14.

The smoking chamber 12 is also provided with a one-way valve 34. The one-way valve 34 is a passage allowing gases to exit the smoking chamber 12 when a positive pressure, i.e. a pressure greater than the ambient atmospheric pressure, is applied within the smoking chamber 12. When a zero or negative pressure is applied, the one-way valve 34 acts as a barrier, effectively blocking gases from passing, and maintaining whatever vacuum is applied within the smoking chamber 12. This configuration is such that when a user inhales through the smoke outlet 14, the one-way valve 34 is closed, and the user can inhale smoke from the smoking chamber 12 as if there were no valve. However, when there is an excess amount of smoke, or if there is stale smoke in the smoking chamber, the user can instead blow through the smoke outlet 14, causing the one-way valve 34 to open, and causing smoke to be expelled from the smoking chamber. In the illustrated embodiment, the one-way valve 34 is an umbrella valve provided near a lower side of the first section 8 of the housing 6. The main body of the valve 34 may be located on the outside of the housing 6, fitted via a nipple which connects to the inside of the housing 6. Other valve positions and configurations are of course possible. The invention also permits the use of other types of one-way valves, such as a ball valve for example. Some embodiments may be provided without a one-way valve altogether.

In some embodiments, the smoking chamber 12 may comprise a plurality of smoke outlets 14 for connection with a plurality of hoses 15. In such embodiments, the smoke outlet 14 may also comprise the one way valve 34. In this configuration, a user will be able to inhale along through one of the hoses 15 without losing any suction through the other smoke outlets 14 as they will be blocked by their respective one way valves 34.

The second section 9 of the housing houses a combustion unit 16 and an electronics unit 22. The combustion unit 16 is where the combustible material, such as tobacco for example, is heated in order to generate smoke. The combustion unit 16 comprises a capsule holder 18 and a heating unit 20. The capsule holder 18 is a receptacle size and shaped to support capsules 100. The capsules 100 can be filled with combustible material. In some embodiments, the capsules 100 are prepackaged, meaning that they could be filled and sealed prior to being placed in the capsule holder 18. The heating unit 20 is an electrically powered device which is capable of heating the combustible material to a smoke-generating temperature. The electronics unit 22 contains the bulk of the electronics required to operate the hookah 1. It may comprise an electric power unit 24 to power the heating unit 20, and a programmable controller 26 to controllably power the heating unit 20.

The conduit 28 serves to channel smoke from the combustion unit 16 into the smoking chamber 12. It comprises a first extremity 29 extending within the combustion unit 16 and a second extremity 30 extending in the vessel 2. In operation, the second extremity 30 is preferably submerged in liquid 31. In this configuration, the conduit 28 forms part of a smoke path 32 from the combustion unit to the smoke outlet 14. The smoke path 32 begins in the combustion unit 16 where the smoke is initially generated, passes through the conduit 28, then into the vessel 2 underneath the liquid 31, up through the liquid 31 into the smoking chamber 12, and finally out through the smoke outlet 14. A user inhaling through the smoke outlet 14 causes smoke to travel along the smoke path 32 before reaching the user's mouth. In a preferred embodiment, each component connected along the smoke path 32 comprises an air-tight seal. In this fashion, inhaling from the smoke outlet 14 creates suction which draws in smoke uniquely from the combustion unit 16. With the seals, there are no gaps between components where air could be drawn in and thereby cause a loss of suction. Of course, other configurations are also possible as long as the conduit completes its part of the smoke path 32.

In the illustrated embodiment, the conduit 28 is a straight vertical stem made of glass. In this configuration, the conduit 28 is removable via the combustion unit 16 for easy maintenance. The first extremity 29 is also flared, this assures that the conduit 28 can only be inserted in one possible orientation, and also helps to create a seal between the conduit 28 and the combustion unit 16. Other conduit 28 configurations and materials are also possible, of course. For example, the conduit 28 could be made of any material that does not react with water. The conduit 28 could also be a bendable tube made out of a plastic or rubber, for example. In a preferred embodiment, the conduit 28 is sealed along its length. This means that no smoke is lost as it travels from the combustion unit 16 until it is submerged under the liquid 31 in the vessel 2. In some embodiments, either extremity 29, 30 of the conduit 28 may be provided with intake or diffusion holes 33. In alternate embodiments, the conduit could be made of several sub-sections connected together.

ii. Housing

In the present embodiment, the housing 6 is cylindrically shaped complementary to the vessel. It can be made out of metal, or any other heat tolerant material, such as plastic or ceramic. The housing 6 is provided with a removable lid 42 for covering the combustion unit 16. The removable lid 42 is provided with air intake holes 46 which allow ambient air to enter into the combustion unit 16 when suction is applied through the conduit 28. In the illustrated embodiment, the air intake holes 46 are fixed, however in other embodiments, the lid 42 can be provided with an adjustment mechanism, such as a rotatable disk for example, which allows controlling the size and/or number of intake holes. In this configuration, a user can control how much air is available to the ignited combustible material according to his or her smoking preference. Preferably, the lid 42 can comprise a heat insulating material, such as silicone or ceramic, in order to protectively shield an external user from being burned by the combustion unit 16.

Figure 4:
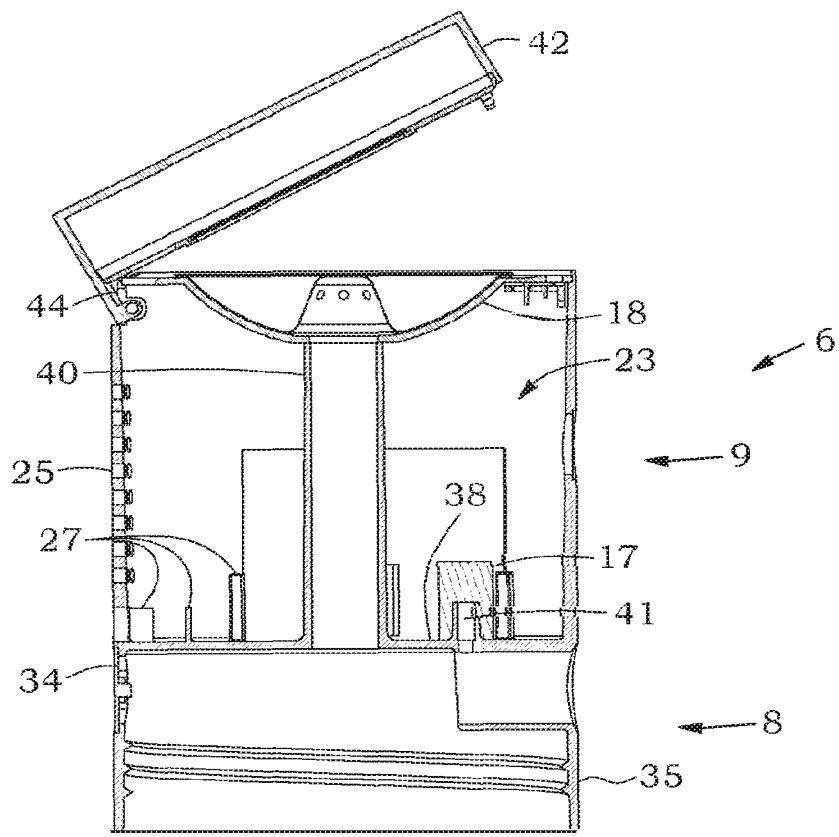
FIG. 4 is a cross section view of a housing in the hookah apparatus of FIG. 1, according to a possible embodiment.

With further reference to FIG. 4, the removable lid 42 is attached to the housing 6 via a hinge 44. In this fashion, the lid can be lifted from one side to allow access to the capsule holder 18. The lid is provided with a latching mechanism 43 for holding the lid closed. In the present embodiment, the latching mechanism comprises a tongue in the lid 42 and a corresponding groove in the housing 6. Other types of latching mechanisms are also possible. For example, the lid could be held closed magnetically. In the present embodiment, the latch can be disengaged by lifting the lid with a sufficient force. In other embodiments, the latch could be disengaged by a button or by an electric control. The latching mechanism 43 can also be provided with a controllable locking mechanism. In such cases, the latching mechanism could be locked while the hookah is in operation in order to prevent a user from opening the lid 42 while the heating mechanism is at a dangerous temperature.

In the illustrated embodiment, the housing 6 is provided with a separator 38, in the present embodiment a plate, which separates the first and second sections 8, 9. When the housing 6 is assembled over the vessel, the plate 38 completes the smoking chamber 12 by capping the aperture 4 of the vessel 2. The plate 38 serves to isolate the second section 8 from the first 9, and blocks smoke or liquid in the smoking chamber 12 from entering the second section 8. The housing 6 is further provided with a capsule holder 18 near an upper portion of the second section 9. The capsule holder 18 and the plate 38 are spaced apart, thereby defining an electronics chamber 23 for housing the electronics unit 22.

The plate 38 can be provided with pass-throughs, allowing fluid communication between the smoking chamber 12 and components in the second section 9. In the present embodiment, there is a conduit pass-through 40 connecting the combustion unit 16 to the smoking chamber 12. In the illustrated embodiment, the conduit pass-through 40 is a hollow tube extending from the plate 38 to the bottom of the capsule holder 18 in the combustion unit 16. The hollow tube 40 is sized and shaped to receive the conduit 28. As can be appreciated, the hollow tube 40 allows communication between the combustion unit 16 and the smoking chamber 12 via the conduit 28, while maintaining an isolation between the electronics chamber 23 and the smoking chamber 12, thereby protecting the electrical components housed within the electronics chamber 23 from liquid 31 or smoke in the smoking chamber 12. If the hookah apparatus 1 were to be tilted or inverted, liquid 31 travelling through the conduit pass-through 40 would travel within the confines of the tube 40 until reaching the capsule holder 18. The liquid 31 therefore does not have a path into the electronics chamber 23. In this configuration, there is a permanent seal between the smoking chamber 12 and the electronics chamber 23 which is independent from the conduit 28. The conduit 28 could therefore be easily removed without affecting the mentioned seal. In some embodiments, the conduit pass-through 40 could serve to complete the smoke path 32. For example, the conduit 28 could be configured such that the first extremity 29 is scalingly connected to the underside of the plate 38 around the conduit pass-through 40. In this configuration, the conduit pass-through 40 serves to channel smoke from the combustion unit 16 down to the plate 38, while the conduit 28 completes the smoke path 32 and channels the smoke from the plate 38 into the vessel 6. In other embodiments, the conduit pass-through 40 could be a simple hole in the plate 38 through which the conduit 28 could pass. However, liquid 31 could potentially enter the electronics chamber 23 through an area between the conduit and the pass-through hole 40. An additional seal would therefore be required between the conduit 28 and the plate 38 around the hole 40. The seal would be affected by the position and configuration of the conduit 28 making it difficult to assure a strong seal, and making it difficult to remove the conduit 28.

The plate 38 can be provided with additional pass-throughs in order to allow some of the electronics, such as specialized sensors for example, to communicate with the smoking chamber 12. In the illustrated embodiment, there is a sensor pass-through 41. The sensor pass-through 41 connects a sensor 17 in the electronics chamber 23 with the smoking chamber 12. In the illustrated embodiment, the sensor pass-through 41 is a small hole with a cylindrical wall located on the plate 38, just above the smoke outlet 14. The cylindrical wall is configured for attachment to the input end of a pressure sensor 17, via a flexible tube for example, while the body of the sensor 17 is located in the electronics chamber 23. The pressure sensor 17 can detect a change in pressure inside the smoking chamber 12 in order to determine when a user is inhaling through the smoke outlet 14. This sensed information can be used to control the hookah. Preferably, there is a permanent seal around the sensor pass-through 41 so that no smoke or liquid 31 can enter the electronics chamber 23. In other embodiments, other types of sensors could be used to detect the flow of gases within the smoking chamber, such as a turbine, motion sensor or smoke detector. Some embodiments permit the use of several sensors, each having their own pass-throughs. Additionally, the pass-throughs can serve to allow a probing portion of the sensor to pass into the smoking chamber 12.

In further detail, the electronics chamber 23 is configured to house several electronic components. Inside the electronics chamber 23 are electronic supports 27 configured to receive and support a power unit 24 and a programmable controller 26. The housing 6 is also provided with air holes 25 in the electronics chamber 23 to help cool the electronic components. It may also be provided with one or several input/output (I/O) outlets 58 for allowing I/O elements 56, such as a light or button, to be viewed and/or interacted with outside of the housing 6. In some embodiments, one of the I/O elements 56 can be an LED or a series of LEDs. The LEDs could be a power level indicator serving to indicate a power level of the power unit 24. The LEDs could also be a power state indicator light to indicate a power state of the heating unit, for example to indicate if the heating unit is operating under full power, in a low power mode, or if the heating unit is on/hot or off/safe to handle. Other embodiments may also have decorative LEDs, or LEDs to illuminate different function components, such as the heating unit 20, capsule holder 18 or vessel 2. For example, the housing 6 could be provided with a circular formation of LEDs shining downwards towards the vessel 2, and these LEDs could also be used to indicate the power state of the heating unit or other functional states of the hookah.

In the illustrated embodiment, the power unit 24 is a direct current (DC) power unit comprising rechargeable batteries. However, in other embodiments, the power unit 24 could be an alternating current (AC) power unit. The power unit 24 may include a protection circuit module (PCM) to protect the batteries from over-charging, over-discharging, or over-drain. It may also include a temperature sensor, such as a thermocouple, for monitoring the temperature of the batteries. The power unit 24 may further include an AC to DC converter to allow the batteries to be charged by external AC power. The device can be powered exclusively by the power unit 24, or could also be powered by the external power, which may be either AC or DC. External power can be received through outlet 58 located on the side of the housing 6. DC power from the power unit 24 is used to power the programmable controller 26. The heating unit 20 can also be powered by DC power, or alternatively by AC power.

With further reference to FIG. 2A, in the present embodiment, the programmable controller 26 is a printed circuit board (PCB) including a processor 261 and programmable memory 262. In some embodiments, the PCB 26 may also include wireless communication means 263, such as a Bluetooth or Wi-Fi chip or the like. The PCB 26 is in electrical communication with the heating unit 20, I/O elements 56 and the sensors 17. Responsive to input signals from the sensors 17, I/O elements 56, and/or wireless communication means 263, the controller 26 operates the heating unit 20 in accordance with its programmed instructions. Details regarding the programmed instructions will be presented later in the present disclosure.

The arrangement of the electronic components within the electronics chamber 23 can vary according to different embodiments. Preferably, the electronics are arranged uniformly around a common central axis, i.e. the conduit 28, to assure that there is an even weight distribution to promote an overall stable and centered balance of the hookah apparatus 1.

iii. Heating Unit

In more detail, and as best shown in FIG. 2, the heating unit 20 comprises a heating plate 21. The heating plate 21 is a flat disc-shaped heating element capable of being electrically powered to heat the combustible material in the capsules 100 to a smoke-generating temperature. In the present embodiment, the heating plate 21 is supported by a heating plate support 19 above the capsule holder 18. In this configuration, the heating plate 21 is not in direct contact with the capsule 100. The heating plate 21 and support 19 are also integrated within the removable lid 42. In this configuration, the heating element 21 moves with the lid 42 when the lid 42 is opened. Other configurations are of course possible. For example, the heating plate 21 could be positioned below the capsule holder, or could be integrated into the capsule holder 18.

Figure 5:
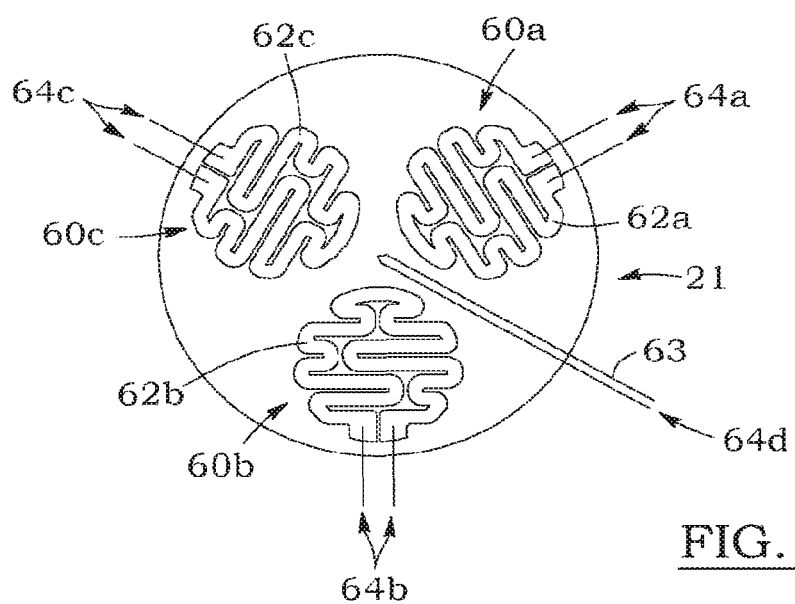
FIG. 5 is a top view of a heating plate in the hookah apparatus of FIG. 1, according to a possible embodiment.

In a preferred embodiment, the heating plate 21 is configured such that its temperature and heat distribution can be controlled. With further reference to FIG. 5, the heating plate 21 can comprise separate heating sections 60*a*, 60*b*, and 60*c*. Each heating section comprises individually controllable resistive elements —62*a*, 62*b*, and 62*c*. In this configuration, specific sections of the heating plate_-21 can be activated by the electronics unit 22 in order to only heat a corresponding section of the combustible material contained in the capsule. This allows the combustible material to be burned at a desirable temperature, while also favoring optimal yield from the capsule. Other variations are also possible. For example, portions of the resistive element 62*a* of one heating section 60*a* can be interleaved with the resistive element 62*b* of another section 60*b*. Of course, the heating plate can be provided with more or less heating sections that what is shown in FIG. 5.

The heating unit 20 may also comprise a temperature sensor, such as a thermocouple 63, for monitoring the temperature in the combustion unit 16. In the present embodiment, the thermocouple in integrated into the heating plate 21 and measures the temperature of the heating plate 21. A signal from the thermocouple can be interpreted by the programmable controller 26 in order to control the operation of the heating unit 20. In other embodiments, the temperature sensor could be located elsewhere. It could be integrated into the capsule holder 18 or in the removable lid 42 for example.

Each of the resistive elements 62*a*, 62*b*, 62*c* in the heating unit 20 are electrically connected to the electronic unit 22 via connection wires 64*a*, 64*b* and 64*c*. Each resistive element 62*a*, 62*b*, 62*c* has a dedicated connection to supply a current thereto from the power unit 24. The current flowing from the power unit 24 is controlled by the programmable controller 26. Of course, in other embodiments, the heating unit 20 could be powered through a different type of connection with the power unit 24. For example, it could be heated by magnetic induction. In the present embodiment, the thermocouple 63 is connected directly to the programmable controller 26 via the connection wires 64*d*. In other embodiments, it could be connected wirelessly, for example.

iv. Capsule Holder

Still referring to FIGS. 1 to 3, the capsule holder 18 is a receptacle sized and shaped for receiving capsules 100. The capsule holder 18 is complementary in shape to the capsule 100, such that the capsule 100 can fit stably within the capsule holder 18 and such that there is an airtight seal between the capsule holder 18 and the capsule 100. In the present embodiment, the capsule holder 18 sits on a lip inside the housing 6 and rests atop the conduit pass-through tube 40 while being sealingly connected thereto. It is also sized to act as a cap atop the electronics chamber 23, sealingly separating the electronics chamber from the combustion unit 16.

Figure 6:
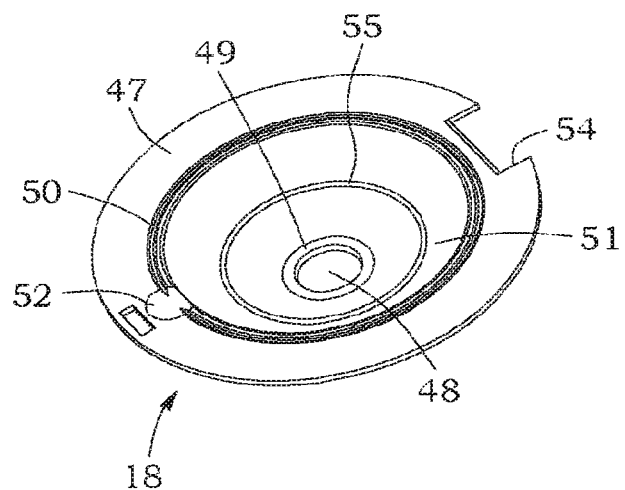
FIG. 6 is a perspective view of a capsule holder in the hookah apparatus of FIG. 1, according to a possible embodiment.

With further reference to FIG. 6, the capsule holder 18 comprises a concavely shaped portion 51 and a rim 47 around its periphery for connection with the housing. In the present embodiment, the concavely shaped portion 51 is an inverted dome for receiving a corresponding portion of a capsule 100, but in other configurations, it may be shaped differently to accommodate a different capsule design. The capsule holder 18 is also provided with a central aperture 48, allowing the conduit 28 to pass through and into the conduit pass-through 40. In the present embodiment, the central aperture 48 is configured to support the conduit 28 when it is inserted therein. In particular, the central aperture 48 comprises an abutment portion 49, which is a flat area near a lower portion of the dome 51. The abutment portion 49 serves to provide a normal force against the flare in the first extremity 29 of the conduit 28, blocking the conduit 28 from passing through the central aperture 48 completely.

In further detail, the capsule holder 18 may comprise a mechanism for easily removing a capsule 100 therefrom. In the present embodiment, the removal mechanism is a notch 52. The notch 52 is a small cut-out or recess in the capsule holder 18, proximate to where the rim 47 and dome 51 meet. The notch 52 is positioned such that it rests underneath the outer edge of a capsule 100 when fitted within the capsule holder 18. The notch 52 is sized to accommodate the finger or nail of a user, allowing the user to get leverage underneath the capsule 100 for easy removal thereof. Other types of removal mechanisms are also possible. For example, the removal mechanism could be a lever, an actuating rod, or a controllable jet of compressed air.

The capsule holder 18 may also be configured to accommodate the configuration of the removable lid 42. In the present embodiment, the capsule holder 18 is provided with a cut-out or recess 54 for accommodating the hinge mechanism 44 in the lid 42.

In a preferred embodiment, there is an airtight seal between the capsule holder 18 and the capsule 100. The capsule holder 18 may therefore be provided with a groove 50 for snugly receiving a portion of the capsule 100 and may also be provided with an O-ring 55 or gasket where the capsule holder 18 interfaces with the capsule 100. For example, the O-ring or gasket may be provided in the dome 51. Preferably, there is also an airtight seal between the capsule holder 18 and the conduit 28. Therefore, an O-ring or gasket may also be provided where the conduit 28 interfaces with the capsule holder 18. For example, the O-ring or gasket could be provided along the flared portion of the conduit 28, or along the abutment portion 49 of the capsule holder 18.

In some embodiments, the capsule holder 18 may be provided with sensors to provide the programmable controller 26 with information about the capsule 100. For example, the capsule holder 18 could be provided with a scanning sensor 53 such as an optical scanner, radio-frequency identifier (RFID) scanner, or the like, to detect if the capsule 100 is new or used. A similar scanning sensor 53 may also be used to detect whether the capsule is authentic, or if it is counterfeited, for example by scanning a barcode or other visual or RFID present in the capsule 100. In alternate embodiments, the scanning sensor 53 could be located elsewhere, such as in the lid 42.

As can be appreciated from the presently described embodiment, each of the vessel 2, electronics chamber 23 and combustion unit 16 are stacked one on top of the other along a common vertical axis, i.e. along the axis of the conduit/stem 28, with the vessel 2 forming the base on top of which the hookah apparatus 1 is supported. In this configuration, the weight is evenly distributed, allowing for the hookah apparatus 1 to be stably supported, even when the vessel 2 is empty, and without the need for an additional support component around the base. When the vessel 2 is filled with liquid 31, the extra weight provided by the liquid 31 is located near the base of the hookah apparatus 1, providing it with a lower center of gravity and thus improved stability. The combination of the stable configuration, along with the sealed compartments, the use of packaged capsules 100, and the absence of hot coals makes the hookah apparatus 1 less likely to spill liquid 31 or hot material.

V. Capsule

Figure 7:
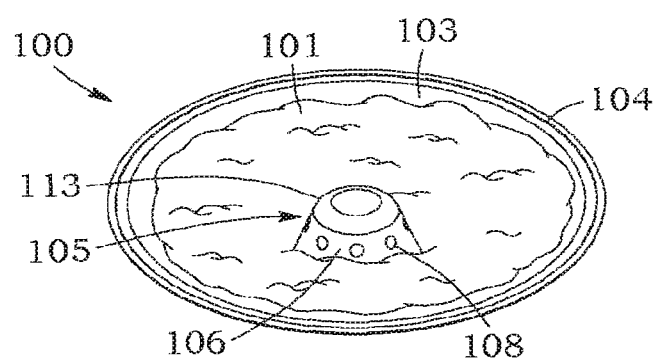
FIG. 7 is a perspective view of a capsule, according to an embodiment.

Referring to FIG. 7, an individual view of an embodiment of a capsule 100 of combustible material is shown. The capsule 100 has a concavely shaped section 103, delimited at its outer edge by a rim 104 and at its inner edge by a protrusion 105. The concavely shaped section 103 supports combustible material 101, such as tobacco for example. The protrusion comprises sidewalls 106 extending up towards a protrusion peak 113. The sidewalls 106 contain several holes 108 preferably slightly above the mid-height of the protrusion, the holes being sized to allow passage of smoke from the capsule while blocking passage of the combustible material.

With further reference the FIGS. 8A, 8B and 8C, the protrusion in the present embodiment is shaped for contact with the conduit in the hookah apparatus. The protrusion is hollow, allowing smoke to be drawn into the conduit through the holes 108. The height of the protrusion 105 is preferably at the same height, or just below that of the rim 104. In other words, the rim 104 defines a plane 114 extending across the top of the capsule 100, and the protrusion is below the plane 114.

The capsule comprises a top surface 109 and a bottom surface 110. The top surface 109 is configured for supporting combustible material 101, while the bottom side 110 is configured to rest against the capsule holder. The top surface 109 can be lined with a water-impervious material to impede liquid from the combustible material from escaping the capsule. The bottom surface 110 can be provided, for example, with a sealing element 118, such as a plastic or rubber O-ring, to assure an airtight seal with the capsule holder and/or conduit. The rim 104 is provided with a rolled section 112 for fitting within a corresponding section of the capsule holder and providing a tighter seal.

In the present embodiment, the concavely shaped section 103 is dome-shaped with a flattened lower portion 107. Other shapes are also possible, such as a cylinder from example. In the illustrated embodiment, liquid from the combustible material can accumulate near the bottom of the dome 103 and will be concentrated to a small area around the protrusion 105. In this configuration, the liquid will only wet a small amount of the combustible material, instead of spreading out and covering a larger area as it would if the capsule were cylindrical.

In the present embodiment, the holes 108 are placed at a higher elevation so that the liquid cannot enter easily, effectively stopping the liquid from entering the conduit and thus making cleanup easier. The holes 108 could be placed at the top of the protrusion 105, but in the present embodiment, they are placed slightly above the half-height of the protrusion 105 for optimal smoke flow. In this configuration, the holes are effectively placed at the half-way point in the height of usable combustible material. When the capsule 100 is filled with combustible material, the material will pile above the holes 108. Thus, when the combustible material is burned, smoke can be drawn easily a small distance down into the holes. When burned, the combustible material will eventually lower below the holes. At that point, smoke can be drawn easily a small distance up to the holes. Since liquid accumulates at the bottom of the dome 103, the holes are positioned above the height at which the liquid accumulates.

The capsule 100 can be made out of any heat resistant material, such as aluminum for example. It can also be provided with an air permeable membrane 115 or lid for containing the combustible 101 material and/or for protecting the capsule while allowing air to pass while in use. For example, perforated aluminum foil 114a can be provided permanently along the plane 114 defined by the rim 104. In such embodiments, the capsule 100 could be said to be prepackaged. Prepackaged capsules 100 may also be provided with a peelable or removable plastic or aluminum cover 119 which could cover the top of the perforated aluminum foil 114, and also extend to cover the underside of the hollow protrusion 105. Preferably, the rim 104 is provided with a step 111. This allows for the removable cover 119 to be bonded to the rim 104, without being bonded to the permeable membrane 115. In this configuration, the removable cover 119 can be peeled off by a user without also accidentally removing the permeable membrane 115.

In some embodiments, the capsule may be provided with an identifier tag 116. The identifier tag 116 could be an RFID or optical tag containing information allowing a scanner in the hookah apparatus to detect if the capsule is new or used, or authentic or counterfeited, for example. For example, the optical tag could be a laser etch or a physical marking. When the capsule 100 has been used, the tag could change. For example, digital information could be written to the RFID tag upon use, or the optical tag could be made of material which changes appearance upon reaching a predetermined temperature. The tag 116 could also contain a unique key or code known only to authentic manufacturers to allow the hookah apparatus to identify the manufacturing source of the capsule 100. Of course, any other information about the capsule could also be contained in the tag 116, such as heating instructions, expiry date, etc. In the illustrated embodiment, the tag 116 is located proximate to the rim 104. Of course, in other embodiments, the tag could be located elsewhere, such as anywhere along the top surface 109, bottom surface 110, or even in the air-permeable membrane 115, for example.

vi. Programmable Controller and Method of Operation

As discussed earlier, the operation of the hookah apparatus is controlled by a programmable controller, in this case a PCB comprising at least a processor and programmable memory. The controller takes input from feedback signals generated by the various sensors, such as the pressure or smoke flow sensor, and controls output elements in response, such as the heating unit or LEDs, according to the instructions stored in the programmable memory.

Figure 9:
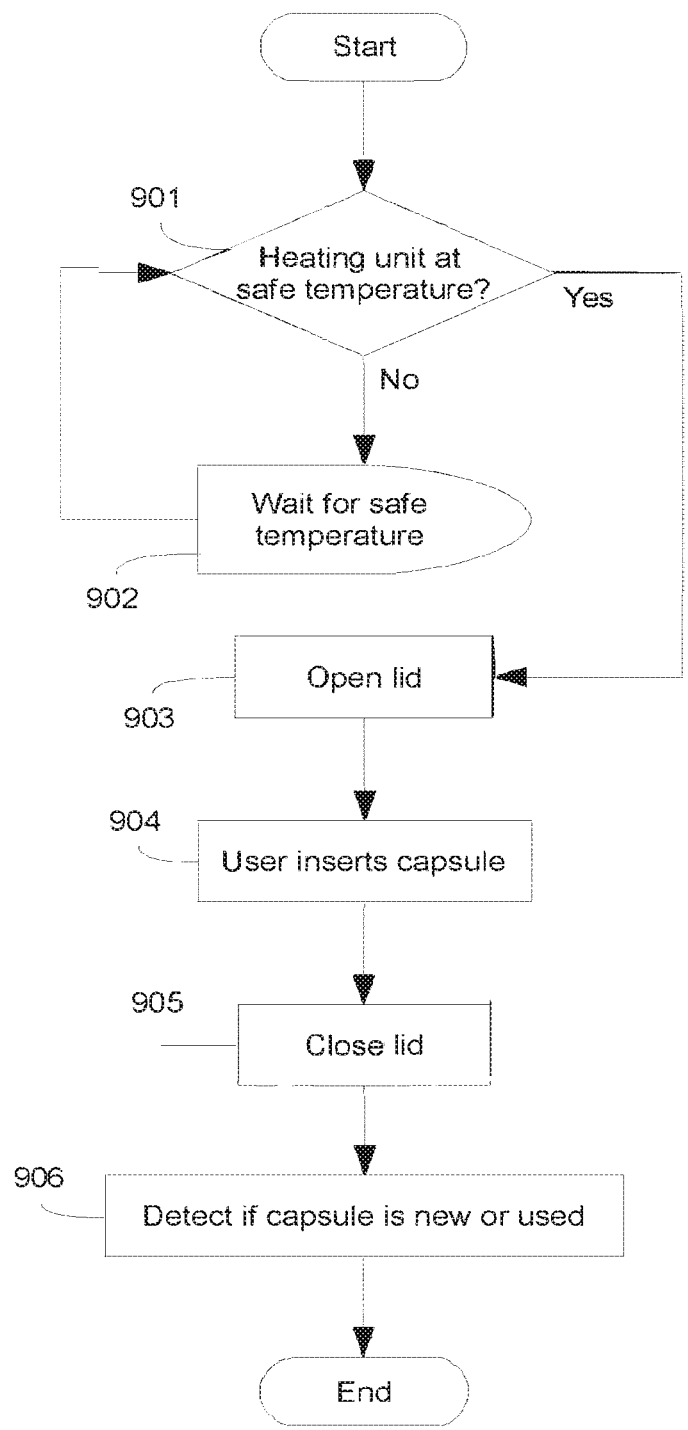
FIG. 9 is a flowchart illustrating the process for inserting a capsule into the hookah apparatus, according to an embodiment.
Figure 10:
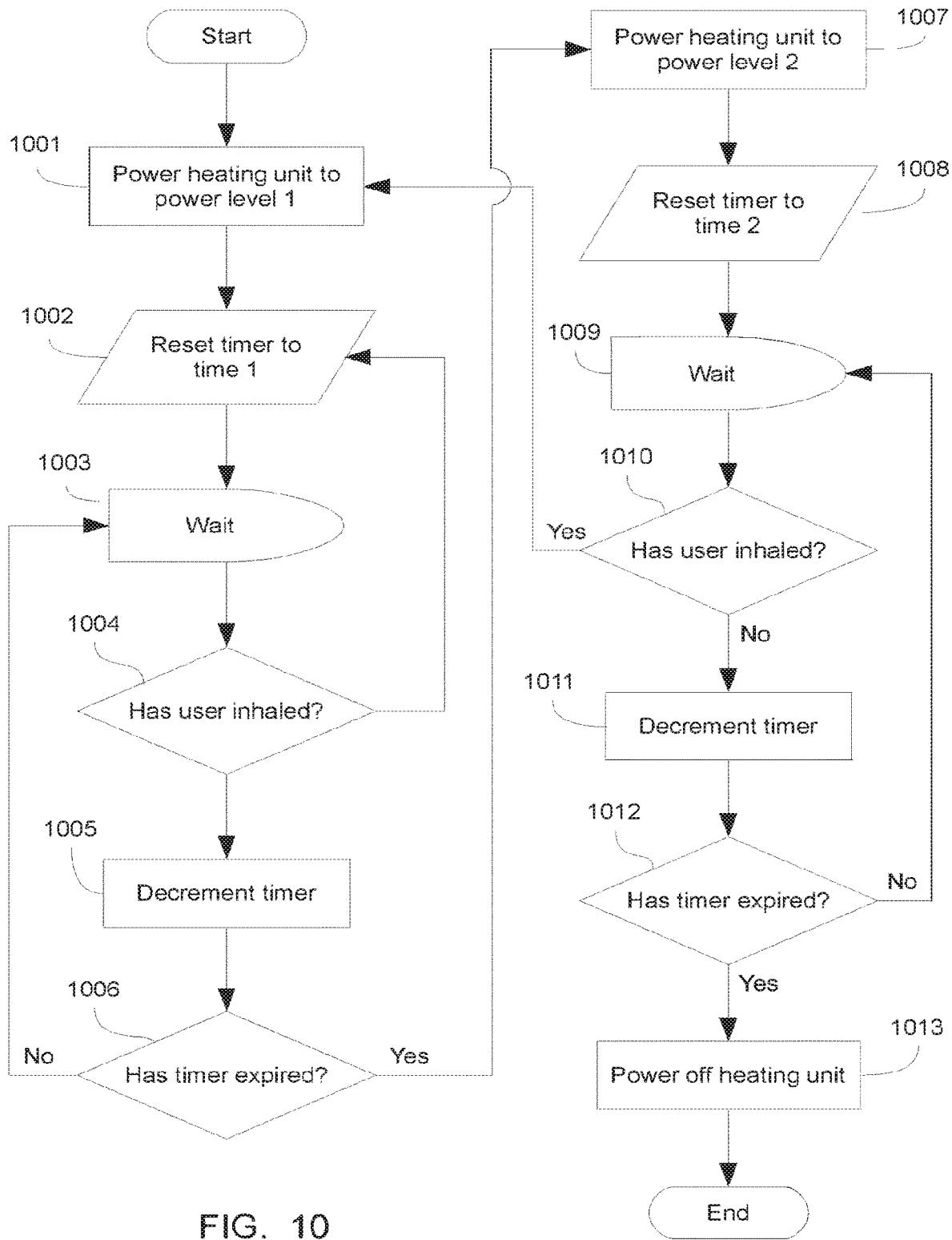
FIG. 10 is a flowchart illustrating the process for controlling the heating unit in the hookah apparatus, according to an embodiment.

Referring to FIGS. 9 and 10, a method for controlling an electrically-powered hookah apparatus is shown. The method involves providing an electrically-powered hookah, such as the one described hereinabove, heating capsules by providing power to the hookah's heating unit, and using the hookah's programmable controller to control the temperature of the hookah's heating unit.

The method starts with FIG. 9, showing a process for inserting/replacing a capsule in the hookah apparatus. The process can be initiated in several ways. It could be initiated, for example, when a user attempts to open the lid by pushing a button. The button generates a feedback signal which is received by the controller.

First, in step 901 the controller uses a feedback signal from a temperature sensor to determine whether the heating unit is at a safe temperature. If the heating unit is too hot, the controller will lock the lid in a closed position, and will wait for the heating unit to cool to a safe temperature 902. Once the controller has determined that the heating unit is at a safe temperature, it will allow the lid to open 903. The controller could, for example, unlock the lid allowing the user to open it manually, or electrically control an actuator to automatically open the lid. Next, the user will insert a capsule 904 and close the lid 905. The lid could be closed automatically by the controller, for example, by using an actuator to close the lid after the user has pushed a button or after detecting the presence of the capsule using a sensor. Finally, the controller will use sensors, such as an optical or RFID sensor, to detect if the capsule is new or used 906. If the capsule is not new, the controller could reject the capsule, for example by re-opening the lid, or blocking further operation of the hookah apparatus. A similar step could also be done to detect the authenticity of the capsule by scanning for a barcode or RFID to avoid the use of counterfeit capsules.

With further reference to FIG. 10, a process for operating the hookah apparatus is shown. This process involves heating the capsule responsive to inhalation by a user. It can be initiated, for example, by closing the lid and powering on the system through the push of a button. The process of FIG. 10 can be initiated if a new, usable capsule is installed and accepted, according to the previously described process for example.

The process begins by powering the heating unit to a first level 1001, also referred to full power mode, using power from the electric power unit. The first level is a predetermined state where the temperature is high enough to ignite the combustible material contained in the capsule, such as between 150 Q (and 500 Q), for example. The heating unit can be powered either by providing it with a predetermined amount of power and/or by monitoring the temperature using a feedback signal and modulating the power to attain the desired temperature. If there is not enough power to get the heating unit up to temperature, the controller could power off the unit instead of continuing.

Once the heating unit has reached the desired first temperature, the hookah is ready for smoking. The heating unit is maintained at the first temperature as long as the hookah remains active. To determine whether or not the hookah is active a timer can be used in conjunction with an inhalation sensor, such as a pressure or movement sensor in the smoking chamber for example. The controller sets the timer to a first predetermined time in step 1002. Next, the controller waits for a small period of time 1003, such as between 5 and 120 seconds. If the user has inhaled during said small period of time, the timer is reset to the first predetermined time, and continues again from step 1002. If the user has not inhaled during the period, the processor decrements the timer 1005. Each time the timer is decremented, the processor checks whether or not the timer has expired, i.e. the timer has been decremented to zero 1006. If time still remains on the timer, the processor waits again and continues from step 1003. If the timer has expired, the processor will place the system in a low power mode.

In the low power mode, the heating unit is powered down to a second lower power level 1007. The second power level is a predetermined state where the heating unit is held at a predetermined low power temperature just low enough to keep the combustible material from burning, but high enough so that a small amount of added heat will allow it to burn. For example, between 150 Q (and 500 Q). In this fashion, the apparatus can save power, while being able to exit from the low power mode quickly when desired.

Once the heating unit has cooled to the second power level, the processor will set the timer to a second predetermined time 1008. The second predetermined time is a time after which the apparatus will shut off if inactive. Once the timer has been set, the controller will wait for a small period 1009 before checking to see if the user has inhaled during that period. If the user has inhaled, the heating unit is powered back to the first power level, and the process continues from step 1001 in the full power mode. If the user has not inhaled the timer is decremented 1011. If the timer has not expired, the processor will wait again and continue from step 1009. However, if the timer has reached zero, the heating unit is powered off 1013. When powered off, the apparatus could enter a low-power sleep mode, for example, where only some components remain active in order to detect when a user starts using the apparatus again. Once the heating unit has been powered off, the user will need to reinitiate the process, by pressing a button or by inhaling through the hose, for example.

Figure 11:
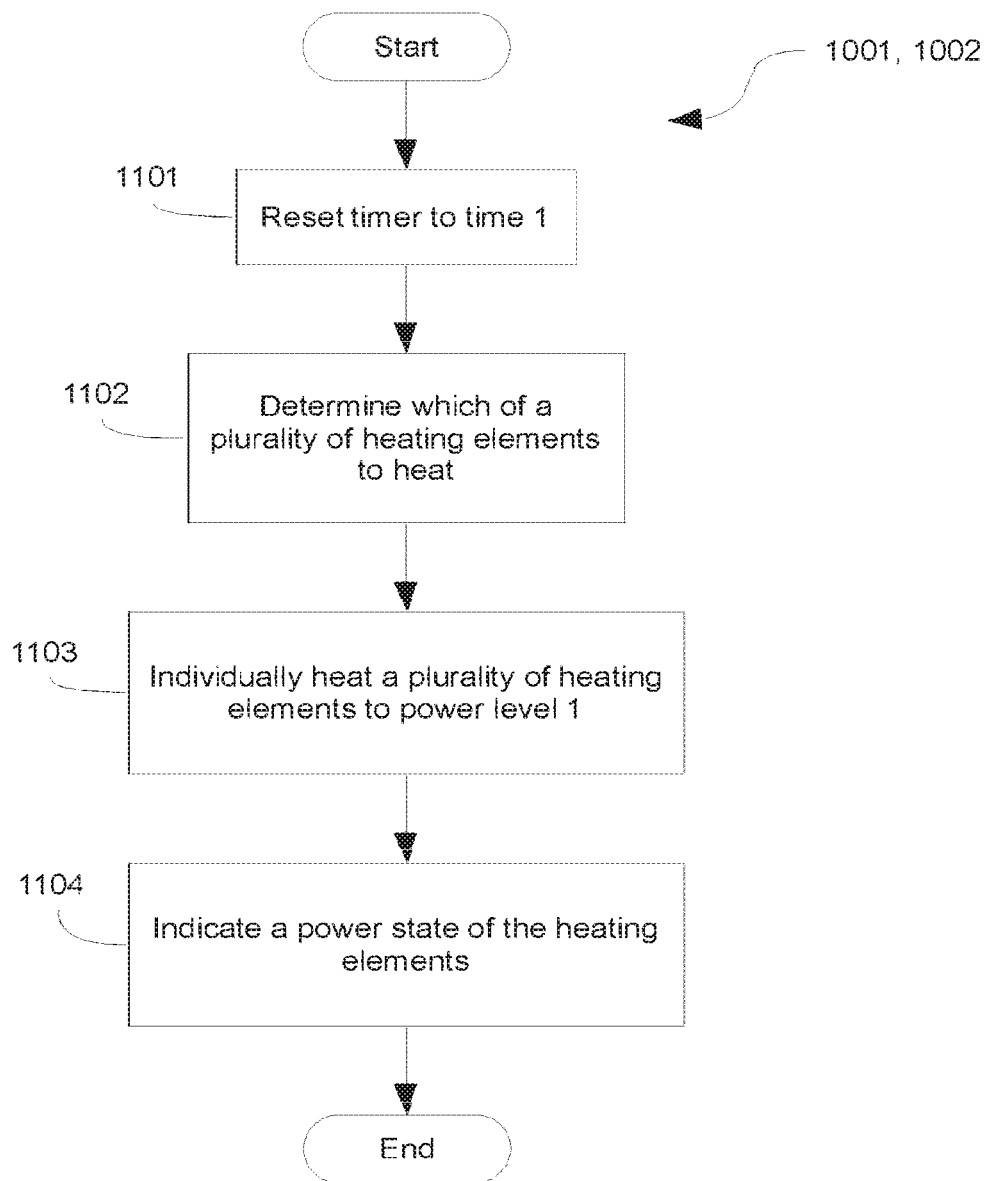
FIG. 11 is a flowchart illustrating the process for individually controlling heating elements in the process of FIG. 10, according to an embodiment.

The above-mentioned processes are exemplary embodiments of a method for operating an electrically powered hookah apparatus. Other variations or additions are also possible. For example, the processor could only heat a portion of a heating element at a time. In an embodiment, steps 1001 and 1002 could be combined. With further reference to FIG. 11, steps 1001 and 1002 could comprise first resetting the timer 1101, then determining which of a plurality of heating elements to heat 1102, and finally individually heating a plurality of heating elements to the first power level 1103. In some embodiment, the processor could contain other timers or counters to make the determination in step 1002, in order to individually power a portion of the heating element for a predetermined amount of time, or for a predetermined number of inhales, after which a different portion of the heating element could be powered.

Further variations are also possible. For example, in step 1104, the programmable controller could control LEDs, for example by altering the intensity, color, or on/off state of the LED to indicate if the apparatus is in full power mode, low power mode, or if it is sleeping or powered down. The LEDs could also be controlled to indicate whether the heating unit is at a safe temperature, if the lid has been locked, or if the capsule has been rejected.

As discussed earlier, some embodiments of the programmable controller may include wireless communication means. In such embodiments, information received via the wireless communication means could be used to program the programmable controller in order to customize its behavior. For example a wireless remote or mobile device (such as a smartphone or tablet running an application) could communicate with the programmable controller via the wireless communication means in order to set the temperatures used in the first and second states in steps 1001 and 1007, the inactivity times in steps 1003 and 1008, or the intensity, color or on/off state of the LEDs in step 1104. In some embodiments, music data could be received via the wireless communication means, in which case the parameters of the LEDs in step 1104 could be controlled responsive to the music data, i.e. the changing of the LED parameters could be synchronized with the music.

The invention claimed is:

1. An electrically-powered hookah apparatus comprising:
    a vessel configured to contain liquid, provided with an aperture;
    a housing comprising:
    a first section removably fitted over the aperture of the vessel and forming with the vessel a smoking chamber, the smoking chamber being provided with a smoke outlet connectable to a hose pipe; and
    a second section comprising:
    a combustion unit including a capsule holder configured to hold capsules of combustible material and a heating unit configured to heat the capsules and generate smoke from the combustible material; and
    an electronics unit including an electric power unit connected to the heating unit and a programmable controller connected to the electric power unit and configured to controllably power the heating unit; and
    a conduit having a first extremity extending in the combustion unit and a second extremity extending in the vessel, said second extremity being sized and configured to be immersed in the liquid during operation of the apparatus, the conduit forming part of a smoke path from the combustion unit to the smoke outlet;
    wherein the hookah apparatus further comprises a temperature sensor for the heating unit and an inhalation sensor to detect a flow of gases from the smoking chamber, the temperature sensor and inhalation sensor being in communication with the programmable controller, and wherein the programmable controller comprises instructions to controllably power the heating unit between a plurality of active heating power levels responsive to inhalation by a user.

2. The electrically-powered hookah apparatus according to claim 1, wherein the vessel, combustion unit and electronics unit are stacked along a common vertical axis.

3. The electrically-powered hookah apparatus according to claim 1, wherein the programmable controller comprises memory containing instructions to modulate a temperature of the heating unit between a first temperature according to a first power level and a second temperature according to a second power level responsive to inhalation by the user.

4. The electrically-powered hookah according to claim 1, wherein the heating unit comprises a plurality of separately controllable heating elements.

5. The electrically-powered hookah according to claim 1, wherein the heating unit comprises a heating plate.

6. The electrically-powered hookah apparatus according to claim 1, wherein the inhalation sensor comprises a pressure sensor configured to detect a pressure within the smoking chamber.

7. The electrically-powered hookah apparatus according to claim 1, wherein the temperature sensor is in fluid communication with the combustion unit and configured to detect a temperature within the combustion unit.

8. The electrically-powered hookah apparatus according to claim 1, wherein the temperature sensor is integrated into the heating unit.

9. The electrically-powered hookah apparatus according to claim 1, wherein a one-way valve is provided in communication with the smoking chamber, the one-way valve being a passage allowing gases to exit the smoking chamber when a positive pressure is applied within the smoking chamber, and being a barrier blocking gases from entering or leaving the smoking chamber when a negative pressure is applied within the smoking chamber.

10. The electrically-powered hookah apparatus according to claim 1, wherein the housing comprises a separator provided between the first and second sections.

11. The electrically-powered hookah apparatus according to claim 10, wherein the separator and the capsule holder are spaced apart, defining an electronics chamber for housing the electronics unit.

12. The electrically-powered hookah apparatus according to claim 10, wherein the separator is provided with a hollow tube extending in the second side, the hollow tube configured to receive the conduit and create a path for passing the conduit through the plate.

13. An electrically-powered hookah apparatus comprising:
a vessel configured to contain liquid, provided with an aperture;
a housing comprising:
a first section removably fitted over the aperture of the vessel and forming with the vessel a smoking chamber, the smoking chamber being provided with a smoke outlet connectable to a hose pipe; and
a second section comprising:
a combustion unit including a capsule holder configured to hold capsules of combustible material and a heating unit configured to heat the capsules and generate smoke from the combustible material; and
an electronics unit comprising an electronics chamber including an electric power unit connected to the heating unit and a programmable controller connected to the electric power unit and configured to controllably power the heating unit; and
a conduit having a first extremity extending in the combustion unit and a second extremity extending in the vessel, said second extremity being sized and configured to be immersed in the liquid during operation of the apparatus, the conduit forming part of a smoke path from the combustion unit to the smoke outlet via the liquid in the vessel;
wherein the housing comprises a separator provided between the first and second sections; and
wherein the vessel, electronics unit and combustion unit are stacked in sequence along a common vertical axis and the electronics chamber is isolated from the conduit.

14. The electrically-powered hookah apparatus according to claim 13, wherein the housing is provided with a lid removably covering the combustion unit.

15. The electrically-powered hookah apparatus according to claim 14, wherein the housing comprises a hinge configured to attach the lid to the housing.

16. The electrically-powered hookah apparatus according to claim 15, wherein the heating unit is contained within the lid.

17. The electrically-powered hookah apparatus according to claim 14, wherein the lid is provided with holes configured to control air intake.

18. The electrically-powered hookah apparatus according to claim 13, wherein the capsule holder is provided with a notch proximate to a perimeter of the capsule of combustible material.

19. The electrically-powered hookah apparatus according to claim 13, wherein the electric power unit comprises one of a direct-current power unit and an alternating-current power unit in the form of a battery or a power supply.

20. The electrically-powered hookah apparatus according to claim 13, wherein the programmable controller is provided with a power level indicator configured to indicate a power level of the power unit.

21. The electrically-powered hookah apparatus according to claim 13, wherein the programmable controller is provided with a power state indicator light configured to indicate a power state of the heating unit.

22. The electrically-powered hookah apparatus according to claim 13, wherein the vessel or housing is cylindrically shaped.

23. The electrically-powered hookah apparatus according to claim 13, wherein the housing comprises hollow tube which passes from the separator and capsule holder to isolate the electronics chamber from the smoke path.

24. A method for controlling an electrically-powered hookah apparatus, the method comprising:
a) providing an electrically-powered hookah apparatus comprising:
a vessel configured to contain liquid, provided with an aperture;
a housing comprising:
a first section removably fitted over the aperture of the vessel and forming with the vessel a smoking chamber, the smoking chamber being provided with a smoke outlet connectable to a hose pipe; and
a second section comprising:
a combustion unit including a capsule holder configured to hold capsules of combustible material and a heating unit configured to heat the capsules and generating smoke from the combustible material; and
an electric unit including an electric power unit and a programmable controller connected to the power unit and configured to controllably power the heating unit; and
a conduit having a first extremity extending in the combustion unit and a second extremity extending in the vessel, said second extremity being sized and configured to be immersed in the liquid during operation of the apparatus, the conduit forming part of a smoke path from the combustion unit to the smoke outlet;

wherein the hookah apparatus further comprises a temperature sensor for the heating unit and an inhalation sensor to detect a flow of gases from the smoking chamber, the temperature sensor and inhalation sensor being in communication with the programmable controller;

b) heating the capsules by providing power from the electric power unit to the heating unit;

c) using the programmable controller to control the temperature of the heating unit by controllably powering the heating unit between a plurality of active heating power levels responsive to inhalation by a user.

25. The method for controlling an electrically-powered hookah apparatus according to claim 24, wherein step c) comprises modulating the temperature responsive to a feedback signal.

26. The method for controlling an electrically-powered hookah apparatus according to claim 25, wherein step c) comprises generating the feedback signal from a sensor configured to detect a flow of gases in the combustion chamber.

27. The method for controlling an electrically-powered hookah apparatus according to claim 25, wherein step c) comprises generating the feedback signal from the temperature sensor configured to detect a temperature in the heating chamber.

* * * * *